(12) United States Patent
Hsu et al.

(10) Patent No.: US 7,996,409 B2
(45) Date of Patent: Aug. 9, 2011

(54) SYSTEM AND METHOD FOR CONTENT-BASED OBJECT RANKING TO FACILITATE INFORMATION LIFECYCLE MANAGEMENT

(75) Inventors: Windsor Wee Sun Hsu, San Jose, CA (US); Shauchi Ong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 11/617,585

(22) Filed: Dec. 28, 2006

(65) Prior Publication Data

US 2008/0161885 A1    Jul. 3, 2008

(51) Int. Cl.
*G06F 7/00* (2006.01)
*G06F 17/30* (2006.01)
*G06F 15/173* (2006.01)
*G06F 15/18* (2006.01)
*H04H 60/33* (2008.01)
*G06K 9/46* (2006.01)
*G06K 9/00* (2006.01)
*G06K 9/62* (2006.01)

(52) U.S. Cl. .............. 707/748; 709/226; 725/9; 706/12; 382/115; 382/202; 382/224

(58) Field of Classification Search .......... 707/6, 103 R, 707/748; 706/12; 382/115, 224, 202; 709/226; 725/9

See application file for complete search history.

(56) References Cited

U.S. PATENT DOCUMENTS

| | | | |
|---|---|---|---|
| 5,214,717 A * | 5/1993 | Kimura et al. ............ 382/202 |
| 7,646,895 B2 * | 1/2010 | Haupt et al. ............. 382/115 |
| 2002/0052898 A1 | 5/2002 | Schilit et al. |
| 2002/0107853 A1 | 8/2002 | Hofmann et al. |
| 2003/0066067 A1 * | 4/2003 | Gutta et al. ................. 725/9 |
| 2005/0256848 A1 | 11/2005 | Alpert et al. |
| 2006/0004847 A1 | 1/2006 | Claudatos et al. |
| 2006/0074912 A1 | 4/2006 | Borthakur et al. |
| 2006/0136428 A1 | 6/2006 | Syeda-Mahmood |
| 2008/0162385 A1 * | 7/2008 | Madani et al. ............. 706/12 |

* cited by examiner

*Primary Examiner* — Wilson Lee
*Assistant Examiner* — Cheryl M Shechtman
(74) *Attorney, Agent, or Firm* — GSS Law Group

(57) ABSTRACT

A method to manage objects in an information lifecycle management system is provided. The method includes determining a score for each of the objects based on a score of at least one feature within respective ones of each of the objects where the score of the at least one feature being associated with a valuation of the at least one feature. The method also includes managing each of the objects based on the score for each of the objects wherein higher scored objects are managed preferentially.

1 Claim, 8 Drawing Sheets

SYSTEM AND METHOD FOR CONTENT-BASED OBJECT RANKING TO FACILITATE INFORMATION LIFECYCLE MANAGEMENT

FIELD OF THE INVENTION

The present invention generally relates to managing data, and more specifically, this invention pertains to a system and method for managing objects for information lifecycle management.

BACKGROUND

In today's information-driven society, organizations are collecting and accumulating more data than ever before. Managing the huge amounts of resulting data is both expensive and complicated. In practice, the data stored is of different value or importance to the organization. If each data object, such as a file, were to be managed in accordance with its value to the organization, the cost and complexity of managing the data would be significantly reduced. Such an approach is generally known as information lifecycle management (ILM).

The key challenge in ILM lies in determining the value of the objects. Traditional Hierarchical Storage Management (HSM) approaches rely on the access history of an object to infer how likely the object will be used in the future but this is not very effective, especially for large archival systems where the accesses do not exhibit much locality of reference. Another proposal is to have the user or some other external entity, such as an associated business process, assign a value to the object. The external entity, however, typically has neither such knowledge nor the wherewithal to perform the assignment.

In view of the foregoing, there is a need for effectively determining the importance and valuation of a data object, such as a file, and for managing the object according to its determined importance.

SUMMARY

A method for intelligently and powerfully managing data objects is provided. It should be appreciated that the present invention can be implemented in numerous ways, such as a process, a service, an apparatus, a system, a device or a method on a computer readable medium. Several inventive embodiments of the present invention are described below.

In one embodiment, a method to manage objects in an information lifecycle management system is provided. The method includes determining a score for each of the objects based on a score of at least one feature within respective ones of each of the objects where the score of the at least one feature is associated with a valuation of the at least one feature. The method also includes managing each of the objects based on the score for each of the objects wherein higher scored objects are managed preferentially.

In another embodiment, a computer readable media having program instructions for managing data is provided. The computer readable media includes program instructions for determining a score for each of the objects based on a score of at least one feature within respective ones of each of the objects where the score of the at least one feature is associated with a valuation of the at least one feature. The computer media also includes program instructions for managing each of the objects based on the score for each of the objects wherein higher scored objects are managed preferentially.

In yet another embodiment, a system for managing data is provided. The system includes an object valuator for determining a score for each of the objects based on a score of at least one feature within respective ones of each of the objects where the score of the at least one feature is associated with a valuation of the at least one feature. The system also includes an information lifecycle engine for managing each of the objects based on the score for each of the objects wherein higher scored objects are managed preferentially.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is provided for intelligently and powerfully managing data objects. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

In one example of an information lifecycle management system, an object that is of high importance to the organization could be stored in a first tier storage, replicated remotely, and restored at high priority from a backup system while an object that is determined to be of lesser importance could be stored in less expensive storage, replicated locally and restored in the background from a backup system.

Embodiments of the present invention effectively provide methods and systems for effecting information lifecycle management through object ranking. In general terms, embodiments of the present invention include: (1) receiving objects (e.g., files, documents, records, tables, databases) to be managed; (2) determining a score for each of the objects which may include collecting information about the importance/value of the objects, and/or retrieving a previously assigned score to the objects; and (3) managing the objects based on the scores for information lifecycle management which may include actions for storing, moving, or retrieving data on or from associated storage devices depending on the scores of the objects. It should be appreciated that any suitable types of storage devices may be utilized in conjunction with this invention such as, for example, hard disks, floppy disks, tapes, CD-ROMs, DVD's, storage servers, NAS's, SAN's, RAM, flash memory, MRAMs, etc. The importance or value of an object includes the likelihood that it will be used or used in the near future, or the value that it can bring to an organization. The current invention uses the information content such as, for example, statistics of features of an object, to associate a score with the object and to manage the object based on the associated score. Therefore, embodiments of the present invention may effectively manage storage and retrieval of objects in an information lifecycle management system based on the scores of corresponding objects.

Figure 1:
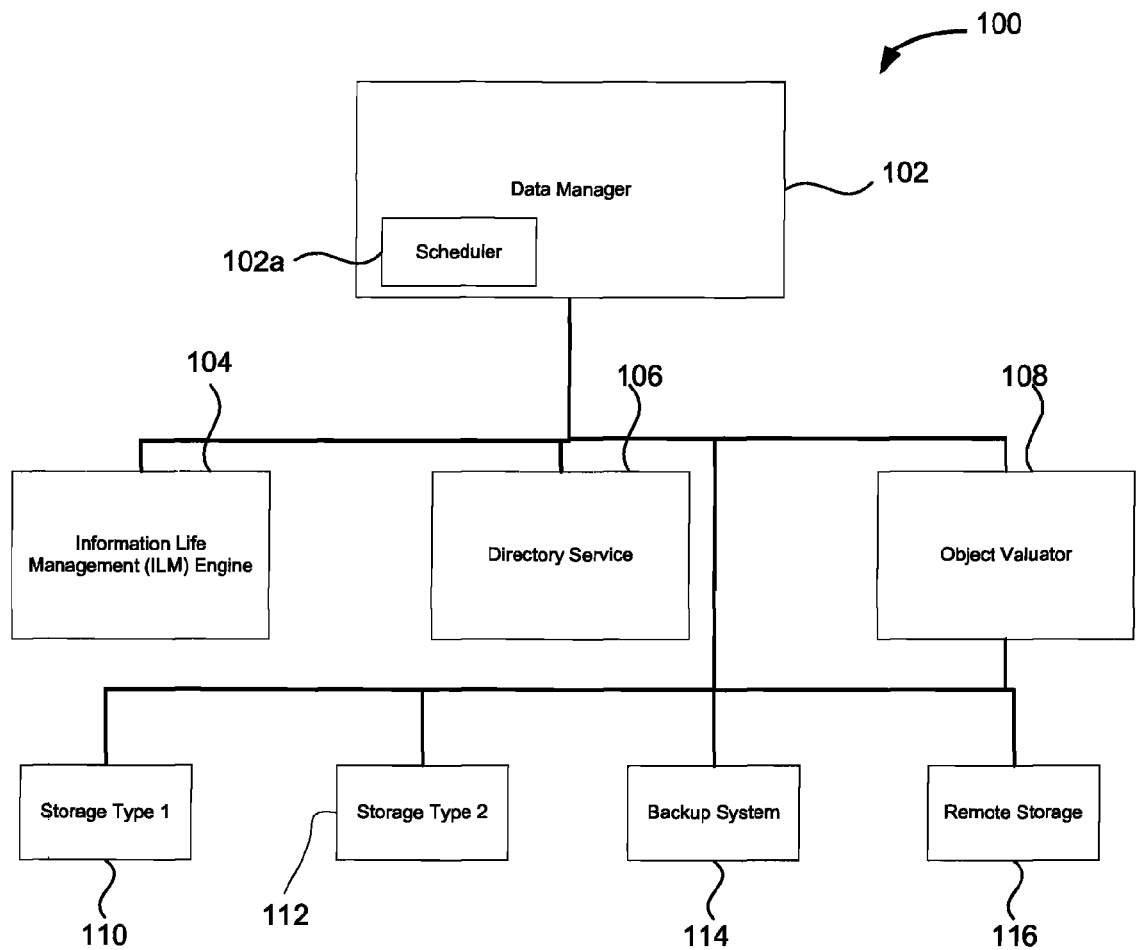
FIG. 1 illustrates a block diagram of an information lifecycle management system with object ranking in accordance with one embodiment of the present invention.

FIG. 1 illustrates a block diagram of an information lifecycle management system 100 with object ranking in accordance with one embodiment of the present invention. The system 100 includes a data manager 102 which has a scheduler 102a. The data manager 102 is connected to an information lifecycle management (ILM) engine 104, a directory service 106, and an object valuator 108. The object valuator 108 produces a score for each of the different objects which may be based on the scores for each feature in the objects.

In one embodiment, after the data manager 102 receives a request to take action on an object (e.g., store, re-evaluate, replicate, restore, or retrieve), the object valuator 108 may first gather and calculate scores for each feature in the object. A feature may be any suitable term or word, visual effect such as shape or color, audio effect, semantic or any tangible concept, any combinations of the preceding, or any such combinations occurring close together that can be discerned in the object. The feature may occur in the object content or in metadata associated with the object including the closed captioning of a video clip, the header or trailer of an object such as one complying with the Digital Imaging and Communications in Medicine (DICOM) standard.

In one embodiment, the object valuator 108 may score each feature in the object by examining how common the feature is in the population, how prominent the feature is in an object, and/or how the features should be weighted as predetermined. The scoring for each feature may differ depending on how often the objects containing the feature has been accessed recently and/or whether there were recent search terms contained in the feature being scored. In one embodiment, the object valuator 108 may gather and calculate two sets of statistics for each feature, one regarding the importance of the feature within the object, and a second regarding the importance of the feature within a population of objects.

Once the two sets of statistics for each feature in an object has been determined, the score for the object is determined. In one embodiment, the score for the object may be determined through any suitable statistical method based on the scores of the features contained within that object. In one embodiment, the score of the object may be determined by one or more of the following methods: summing of scores of all features; determining a maximum score of a single feature within the object; summing of scores of a particular number of the top scoring features; and/or summing of scores of a particular number of top features identified based on statistical procedures such as, for example, Kullback-Leibler divergence.

The object valuator 108 passes the score for the object to the data manager 102. In one embodiment, the object valuator 108 stores the score associated with the object. On receiving a restore or retrieval request for an object, the data manager 102 retrieves the score previously associated with the object from the object valuator 108.

The data manager 102 consults the ILM engine 104 to determine the appropriate steps to take to accomplish the storage/moving/replication/restoration/retrieval of the object based on the score for the object. The data manager 102 performs the determined steps accordingly. Depending on the score for the object desired to be managed, the ILM engine 104 may instruct the data manager 102 to store, move, replicate, restore or retrieve the object using different tier storage devices/systems and at different priorities. The directory service 106 keeps track of where the different objects are stored so if an object is desired to be retrieved, the directory service 106 will have the location of the object.

The system 100 may be connected to any suitable type of storage devices such as, for example storage type-1 110, storage type-2 112, backup system 114, and remote storage 116. It should be appreciated that any suitable storage device (s)/system(s) may be utilized in this configuration. In one exemplary embodiment, the storage type-1 may be first tier enterprise-class storage device such as, for example, IBM System Storage DS8000, storage type-2 may be a mid-range or low-end second tier storage device such as, for example, IBM System Storage DS4000. Alternatively, storage type-2 may be a taped-based storage device such as, for example, IBM System Storage TS1120. It should be appreciated that the system 100 may be connected to any number of storage devices/systems such as, for example 1, 2, 3, 4, 5, 6, 7, 8, 9, etc.

In one embodiment of a data storage process, the data manager 102 may receive an object to be stored and requests the score for the object from the object valuator 108. The score may then be determined by the object valuator 108. The data manager 102 may communicate with the object valuator 108 to have the score transferred to the ILM engine 104. The ILM manager 104 may utilize the score of the object to decide how many copies of the data to store and/or where (e.g., which storage device the data should go to) to store the data. The data manager 102 then stores/moves the object to the proper storage device(s). As discussed above, in one embodiment, the score may be determined by the statistics within the object and the statistics within the population of objects. In one embodiment, if the object is highly ranked (i.e., has a higher score) then the object may be stored in a high tier storage (e.g., tier 1 storage). If the object is not ranked high then the object may be stored in a lower tier storage.

In another embodiment, the scores of objects within the system may be re-evaluated. The data manager 102 may decide when to re-evaluate the data. In one embodiment, the scheduler 102a in the data manager 102 may determine whether it is time to re-evaluate the scores by utilizing predetermined criteria. It should be appreciated that any suitable criteria to re-evaluate may be used such as when weighting of the features changes, when storage space is needed in tier one storage, when statistics of the objects changes, etc. In one embodiment the score of an object is re-evaluated when the current value of a statistic used in computing the score of the object exceeds a remembered value of the statistic by some threshold. Then as with the storage operation discussed above, the object valuator 108 determines the score of the object, the ILM engine 104 determines the action to take based on the score of the object, the data manager 102 accomplishes the actual action (e.g. moving of the object to a specific storage device), and the directory service 106 stores the location information of where the object was moved to.

In yet another embodiment, the system 100 may also restore objects from backup system 114 or retrieve objects previously scored and stored in the system 100. In such an embodiment, the data manager 102 may receive a request to restore or retrieve an object. Then the data manager 102 may retrieve an assigned score for the object from the object valuator 108 and transfer the score to the ILM engine 104 which then may determine at what priority the data manager 102 should restore or retrieve the object. The data manager 102 may utilize the directory service 106 to locate the object.

Figure 2:
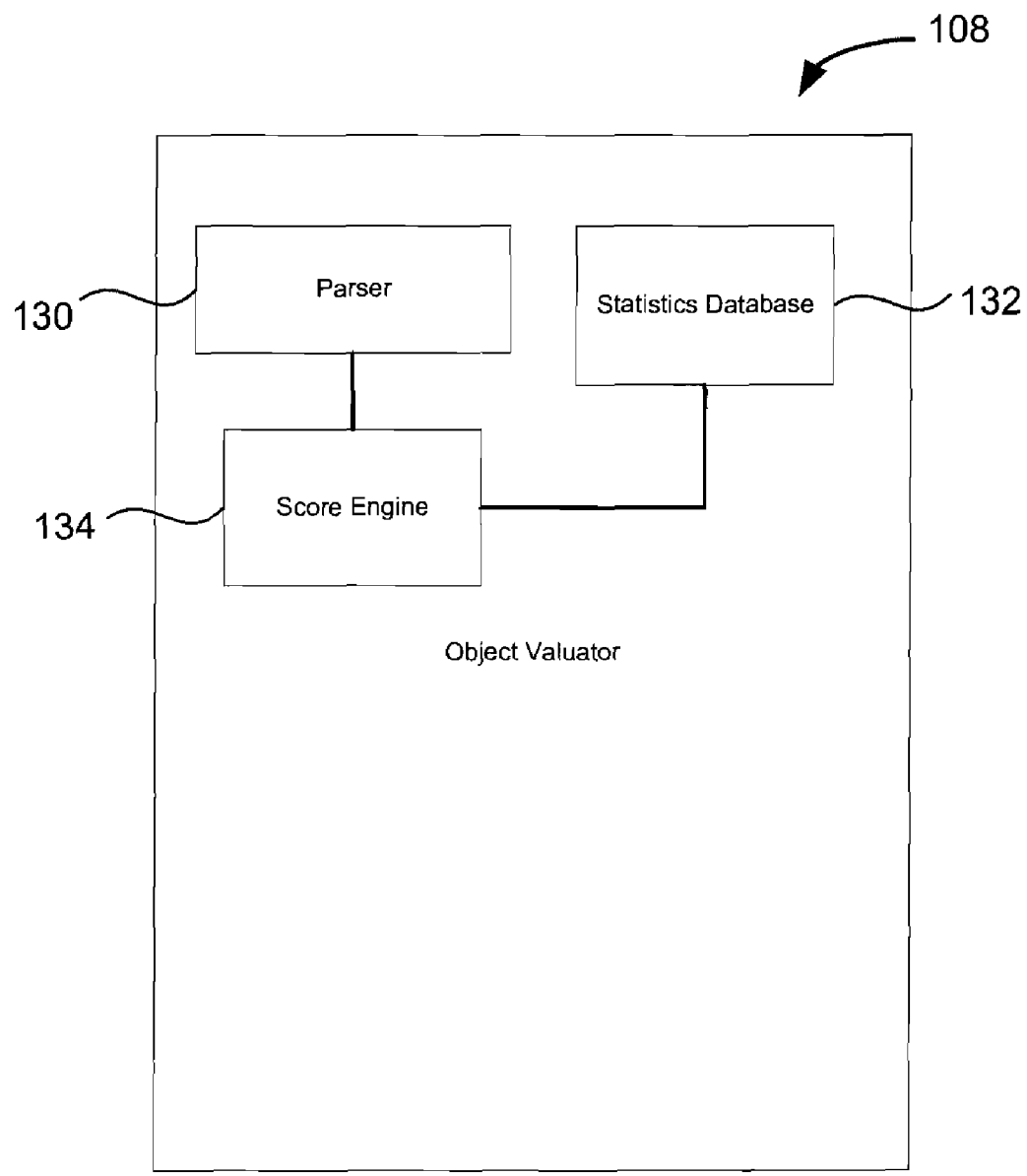
FIG. 2 shows the object valuator in accordance with one embodiment of the present invention.

FIG. 2 shows the object valuator 108 in accordance with one embodiment of the present invention. In one embodiment, the object valuator 108 includes a parser 130, statistics database 132, and score engine 134. The statistics database 132 maintains and updates the statistics associated with each of the features in an object as well as the scores for the features and objects. In one embodiment, the statistics database 132 also maintains, for each feature, the objects containing the feature.

The score engine 134 is responsible for calculating the scores for each object, taking into account any weighting and/or omit lists that may be provided. The parser 130 examines each of the objects to determine the features of the objects. A feature may be any suitable term or word, visual effect such as shape or color, audio effect, semantic or any tangible concept, any combinations of the preceding, or any such combinations occurring close together that can be discerned in the object. The feature may occur in the object content or in metadata associated with the object including the closed captioning of a video clip, the header or trailer of an object such as one complying with the Digital Imaging and Communications in Medicine (DICOM) standard.

The parser 130 then determines statistics for each object and for the population (all data over all objects) as a whole. Exemplary statistics are discussed in further detail in reference to FIG. 4. Based on the features found by the parsing and the determined statistics, the parser 130 updates the statistics database. The parser 130 generates statistics for features on a per document basis and also for the population of objects. The per document statistics and the population statistics are fed to the score engine 134 which calculates the score for the object based on these statistics. It should be appreciated that any suitable method which can determine statistical importance of data in a population of data can be utilized to determine the score of the features/objects.

Figure 3:
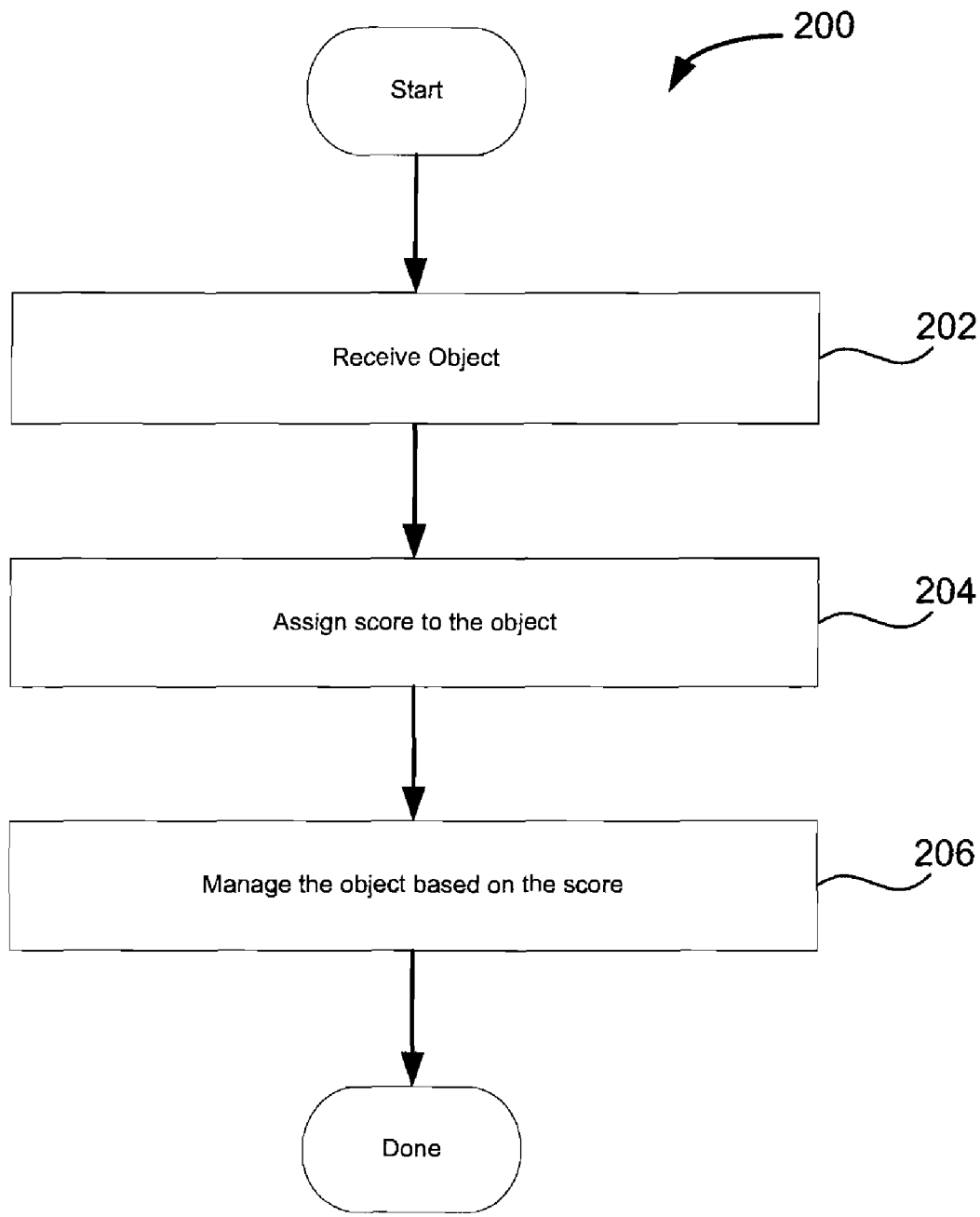
FIG. 3 shows a flowchart defining a method for managing an object in an information lifecycle management system in accordance with one embodiment of the present invention.

FIG. 3 shows a flowchart 200 defining a method for managing an object in an information lifecycle management system in accordance with one embodiment of the present invention. It should be understood that the processes depicted in the flowchart 200 and the other flowcharts herein may be in program instruction form written in any suitable computer readable media. For instance, the program instructions can be in the form of software code developed using any suitable type of programming language. For completeness, the process flow of FIG. 3 will illustrate an exemplary process whereby data objects may be managed in an information lifecycle management system.

The method begins with operation 202 which receives an object. In one embodiment, the object is received for storage in the ILM system 100 as described in further detail in reference to FIG. 1. In another embodiment, the object is re-evaluated for moving in the ILM system as also described in further detail in reference to FIG. 1. In one embodiment, the object is received so that the ILM system 100 can rank and store the objects based on the value of the object as determined by the score of the object.

After operation 202, the method moves to operation 204 where a score is assigned to the object. It should be appreciated that any suitable manner of scoring may be utilized where a value of the object may be determined. In one embodiment, the score is determined for each object based on content of the object. In one embodiment, the content of the object includes the content of features such as, for example, metadata associated with the object such as, for example, the closed captioning of a video clip, the header or trailer of an object such as one complying with the Digital Imaging and Communications in Medicine (DICOM) standard.

In an embodiment, each occurrence of a feature in an object may be assigned a score based on at least one of how common the feature is in the population, how prominent the feature is in an object, how the features should be weighted. Each object may be assigned a score based on the scores of the features it contains. For example, in one embodiment, the score may be based on a sum of scores of all features, a maximum score, a sum of scores of a particular number of top scoring features, or a sum of scores of a particular number of top features identified based on statistical procedures such as, for example, Kullback-Leibler divergence. It should be appreciated that any suitable type of statistical analysis may be utilized to analyze the score or sum of scores to determine the final score of the object. It should also be appreciated that the score of an object may be normalized according to the object size.

Then the method proceeds to operation 206 where the object is managed based on the score. In one embodiment, if the object has a score indicating high value (e.g., high score), the object is stored in tier 1 storage. In one embodiment, a high value may indicate data that is more important or more heavily accessed. Tier 1 storage may be types of data storage devices which enable quick access and storage to data while lower tier storage may be storage devices where access and storage of data take longer than tier 1 storage. Therefore, if the score for an object is lower than a certain value, the object may then be stored in a tier of storage that is lower than tier 1 storage. Consequently higher value objects may be stored and accessed in a more efficient and quicker manner.

Therefore, managing the received object may include deciding whether the object should be stored in a first tier storage (e.g., high-end disk array) or a second or third tier storage (e.g., low-end disk array or tape) or any other suitable lower tier of storage. For example, the first tier storage might be reserved for the highest scored objects that fit within 1 TB of storage or the top ten thousand objects. Managing the received object also includes deciding the number of copies of the object to maintain and whether the object should be remotely replicated. Managing the received object may further include deciding the order in which it should be retrieved from a remote or backup system.

In another embodiment of operation 206, when the object is received, the system may re-evaluate data storage of all objects based on the addition of the new object to the storage system. In such an embodiment, once the object is received and the score determined, depending on the scores of the other objects in the system, the different objects may be moved to differing storage devices than previously stored.

In yet another embodiment of operation 206, different number of copies (e.g., more copies of objects with higher scores) of the object may be kept depending on the score of the object. In another embodiment, depending on the score, the object may be remotely replicated (e.g., the higher the score the greater the probability that the object will be remotely replicated). In another embodiment, the score of the object may determine in what order the object may be restored from a remote or backup system.

Figure 4:
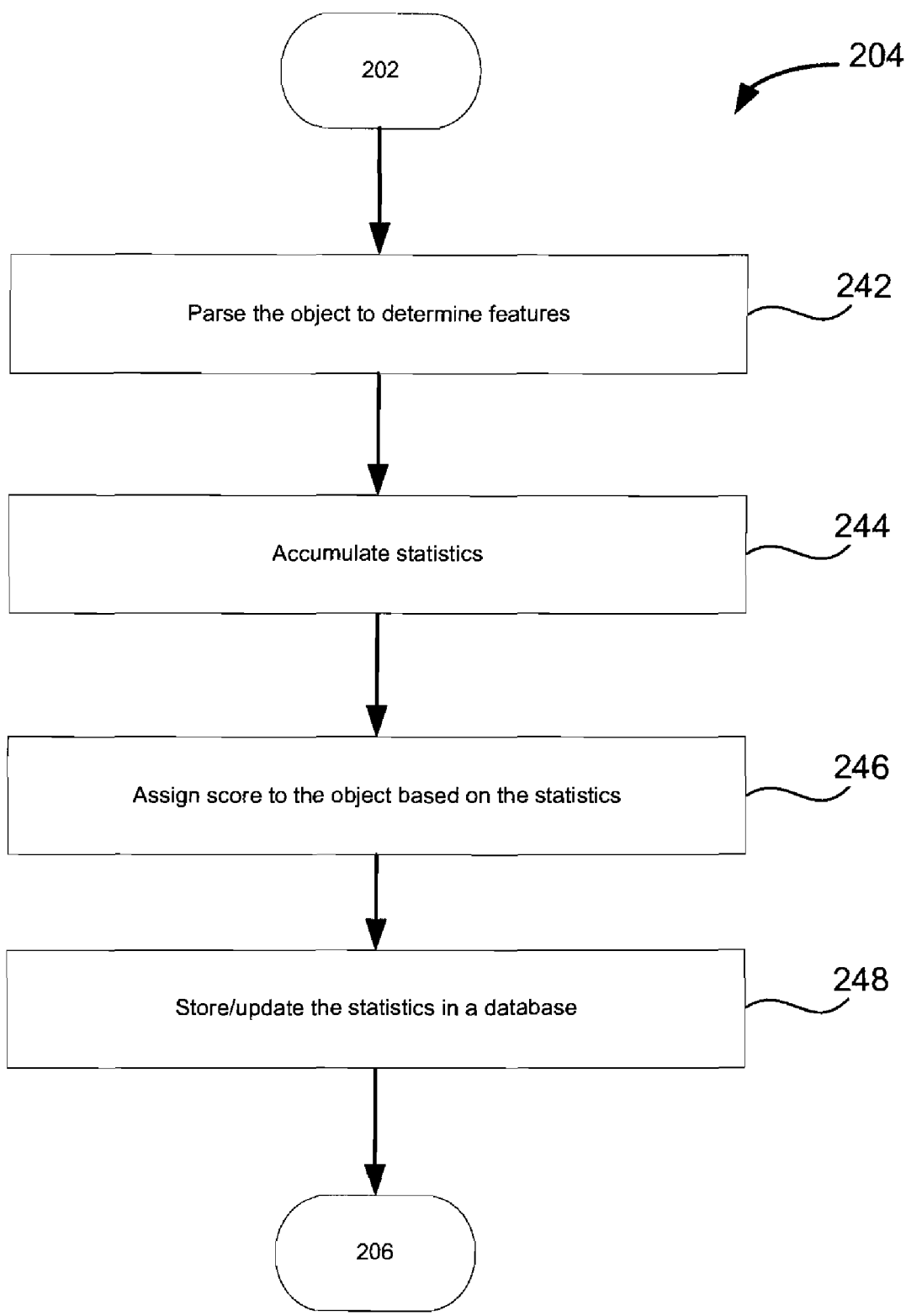
FIG. 4 shows a flowchart which defines assigning a score to an object in accordance with one embodiment of the present invention.

FIG. 4 shows a flowchart 204 which defines assigning a score to an object in accordance with one embodiment of the present invention. In one embodiment, the flowchart 204 begins with operation 242 where the object is parsed to determine features. In one embodiment, the parser as described in FIG. 2 pulls the features from the object. After operation 242, the flowchart 204 proceeds to operation 244 which accumulates statistics. Again, the parser as described in FIG. 2 may conduct this operation. In one embodiment, each object in a collection of objects is assigned a score based on statistics associated with the contents of the collection of objects.

In one embodiment, the statistics include Feature Frequency ff (t,x), which measures the importance or prominence of a feature t in an object x. In one embodiment, the formula shown in Table 1 is used for Feature Frequency:

TABLE 1

$$ff(t, x) = \frac{\log(1 + Occ(t, x))}{\log(1 + avgOcc(x))}$$

In the above equation, Occ(t,x) is the number of occurrences of feature t in object x and avgOcc(x) is the average number of occurrences of features in object x. The statistics may also include Inverse Object Frequency, iof(t), which gives the importance or prominence of the feature itself. The equation in Table 2 is one exemplary embodiment which may produce an Inverse Object Frequency:

TABLE 2

$$iof(t) = \log\frac{O}{O_t}$$

In the above equation, O is the number of objects in the collection and $O_t$ is the number of objects containing the feature t. It should be appreciated that the equations in Tables 1 and 2 are exemplary in nature and other suitable types of equations may be utilized which can determine the concepts embodied in the Feature Frequency and the Inverse Object Frequency.

Then the flowchart 204 advances to operation 246 where a score is assigned to the object based on the statistics. In one embodiment, as described in FIG. 2, the score engine may conduct this operation. Each occurrence of a feature in an object may be assigned a score based on the statistics. In one embodiment, this score may be proportional to both the Feature Frequency and the Inverse Object Frequency. Each object is then assigned a score based on the scores of the features it contains. For example, in one embodiment, the score may be based on a sum of scores of all features, a maximum score, a sum of scores of a particular number of top scoring features, or a sum of scores of a particular number of top features identified based on statistical procedures such as, for example, Kullback-Leibler divergence. It should be appreciated that any suitable type of statistical analysis may be utilized to analyze the score or sum of scores to determine the final score of the object. It should also be appreciated that the score of an object may be normalized based on the size of the object.

In one embodiment, the system is provided with a weighting list containing a list of features and a weight associated with each of the listed features. The weight may be positive or negative. Each occurrence of a feature in an object may be assigned a score that is weighted by the weight associated with the feature in the weighting list. The weighting list can further be based on the features contained in objects that have been accessed recently. The list can also vary with time. For example, in a sporting goods company, a weighting list to be used during the winter season may assign high weights to gear associated with winter sports. In one embodiment, the system is provided with an omit list of features that should be ignored.

After operation 246, the flowchart proceeds to operation 248 where the statistics are stored or updated in a database as described in FIG. 2.

Figure 5:
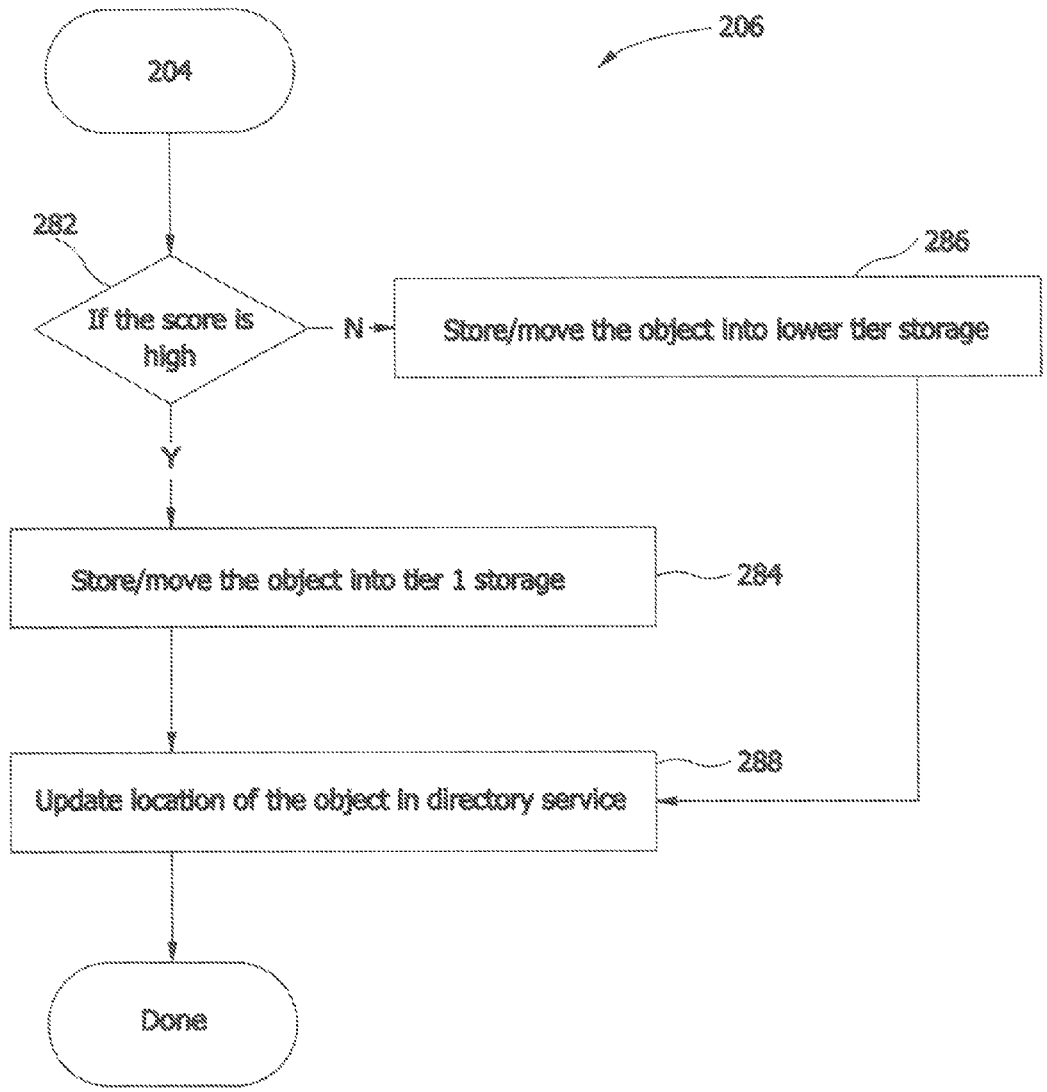
FIG. 5 shows a flowchart which defines managing the object based on the score in accordance with one embodiment of the present invention.

FIG. 5 shows a flowchart 206 which defines managing the object based on the score in accordance with one embodiment of the present invention. In one embodiment, the flowchart 206 begins with operation 282 where if the score is high the method moves to operation 284 and if the score is not high then the method moves to operation 286. In operation 284, the object is stored/moved into tier 1 storage. If the method moves to operation 286, the object is stored/moved into lower tier storage. After with operation 284 or operation 286, the flowchart proceeds to operation 288 where the location of the object is updated in the directory service as described with reference to FIG. 2.

Figure 6:
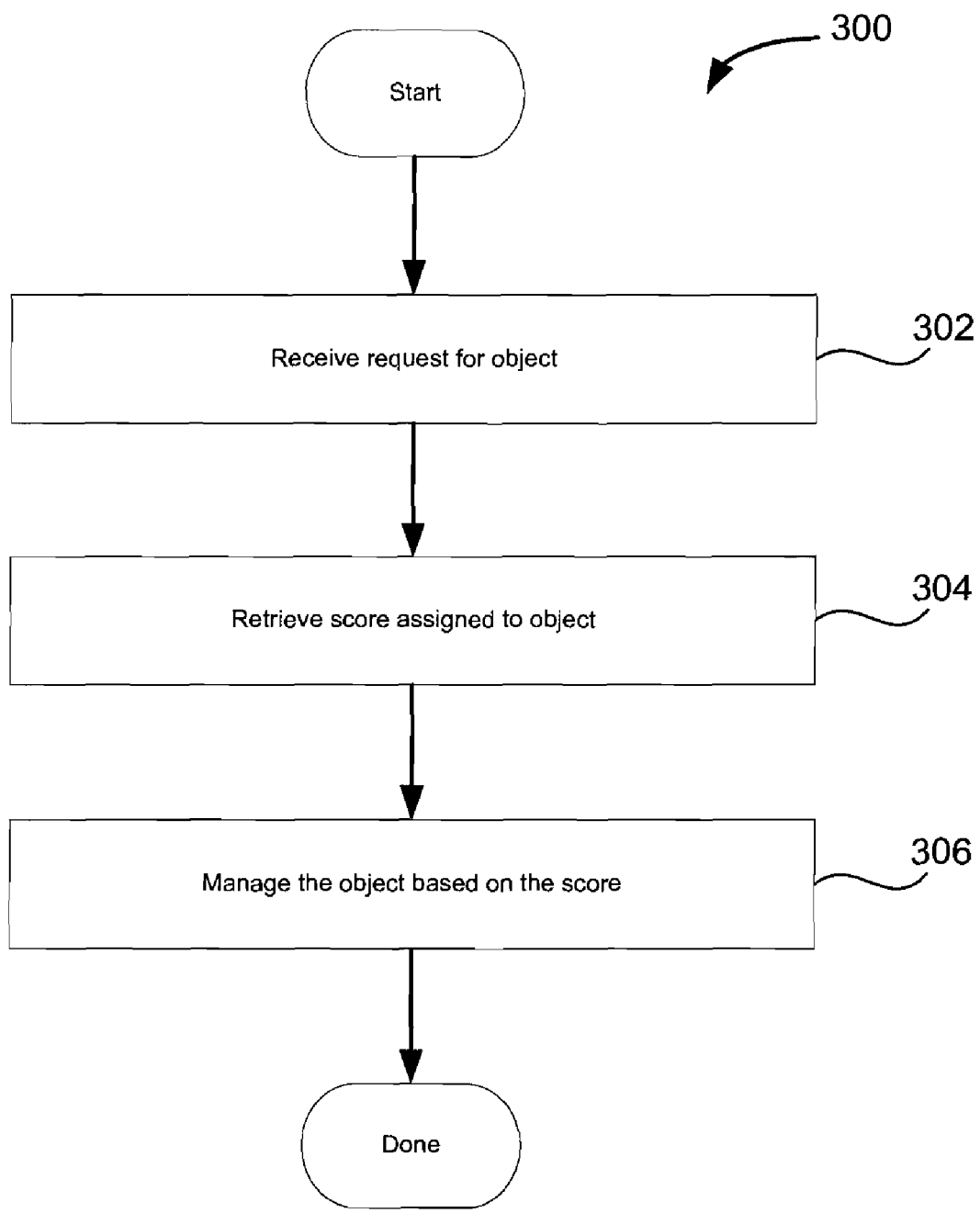
FIG. 6 illustrates a flowchart which defines a method to retrieve an object in an information lifecycle management system in accordance with one embodiment of the present invention.

FIG. 6 illustrates a flowchart 300 which defines a method to retrieve an object in an information lifecycle management system in accordance with one embodiment of the present invention. In one embodiment, the method begins with operation 302 where a request to retrieve an object is received. It should be appreciated that the retrieval request may be any suitable operation where data is requested from the system. In one embodiment, the request to retrieve an object is a request to restore the object from a backup system. After operation 302, the method moves to operation 304 which retrieves a score assigned to an object. In one embodiment of operation 304, the data manager may request the score of the object from the object valuator. Then at operation 306, the object is managed based on the score of the object.

Figure 7:
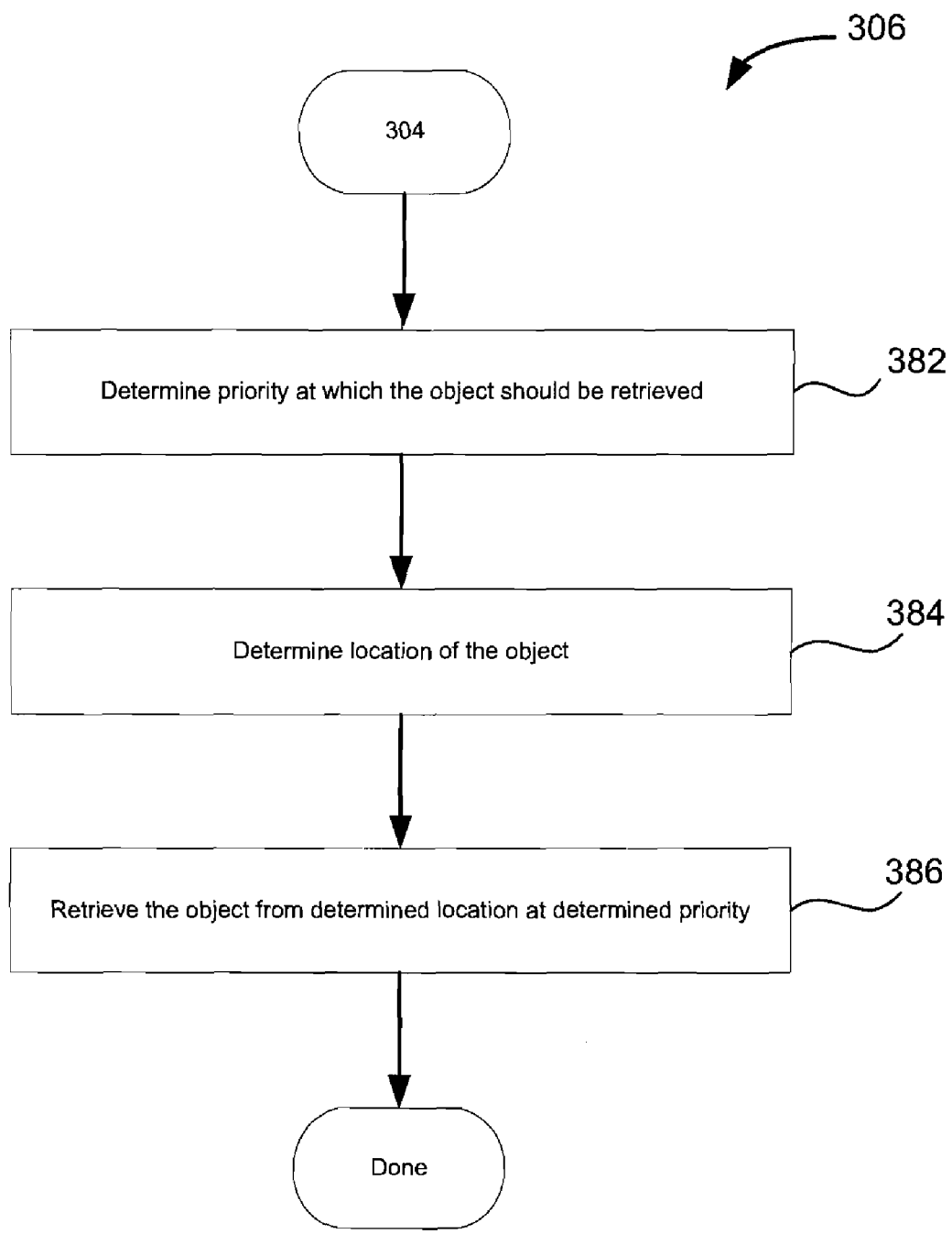
FIG. 7 illustrates a flowchart which defines managing the object based on the score in accordance with one embodiment of the present invention.

FIG. 7 illustrates a flowchart 306 which defines managing the object based on the score in accordance with one embodiment of the present invention. In one embodiment, the flowchart 306 begins with operation 382 which determines the priority at which the object should be retrieved based on the score of the object. Then at operation 384, the location of the object is determined. In one embodiment, the location of the object may be determined from the directory service. After operation 384, the flowchart proceeds to operation 386 where the object is retrieved from the determined location at the determined priority. In one embodiment, an object with a high score is retrieved at high priority while an object with a low score is retrieved at low priority. In another embodiment, the order in which objects are restored from a backup system is determined by the score of the objects.

Figure 8:
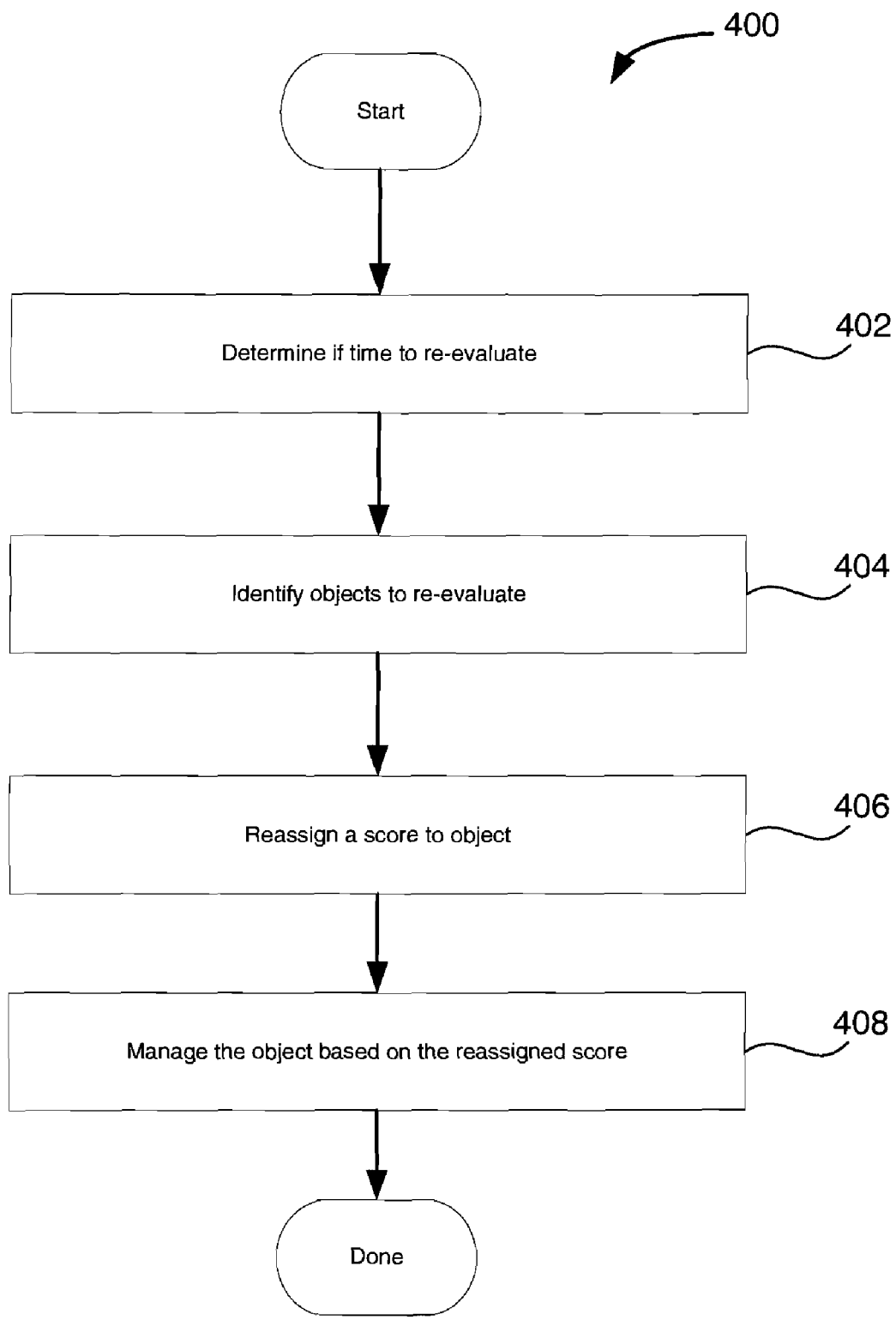
FIG. 8 shows a flowchart which defines a method where objects are re-evaluated in an information lifecycle management system in accordance with one embodiment of the present invention.

FIG. 8 shows a flowchart 400 which defines a method where objects are re-evaluated in an information lifecycle management system in accordance with one embodiment of the present invention. In one embodiment, the method begins with operation 402 determines if it is time to re-evaluate. In an exemplary embodiment, the data manager makes the determination of when to re-evaluate. The time to re-evaluate, in one embodiment, is determined using the criteria as discussed above in reference to FIG. 1. In an exemplary embodiment, the scores associated with the objects are re-evaluated on demand, such as when the user issues a command, when the weighting list is changed, or when storage space is needed in tier one storage. In another embodiment, the re-evaluation is performed periodically or there is a constant background process that continually performs the reevaluation. In one embodiment, the re-evaluation may be triggered when the current value of a statistic used in computing the scores of the objects exceeds a remembered value of the statistic by some threshold.

After operation 402, the method proceeds to operation 404 where the objects to be re-evaluated are identified. In one embodiment, the identification is done based on the how the re-evaluation is triggered. Then operation 406 reassigns a score to the object. In one embodiment, the object valuator analyzes the statistics for the features in each object and using the score(s) of the feature(s) within an object determines the score for that object. After operation 406, the method moves to operation 408 where the object is managed based on the reassigned score. In one embodiment, the ILM engine may decide to move the object to a higher tier storage if the score is higher than previously determined or to move the object to a lower tier storage if the score is lower than previously determined.

While exemplary embodiments of the invention have been discussed focusing on specific statistics and scoring methods, it should be apparent to one skilled in the art that the invention may utilize other statistics and scoring methods. It should also be apparent to one skilled in the art that the invention may be utilized to score non-textual data (e.g., audio data, images). It should further be clear that the scores obtained using the invention could be combined with those obtained with other methods to obtain a final score, and that a system could choose to use this invention for managing a subset of the objects (e.g., those that have not been accessed recently) while relying on other methods for managing the remaining objects.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. It should also be appreciated that any of what is described herein may suitably be utilized in a service to assist in managing data.

The invention can also be embodied as computer readable code on a computer readable medium. The computer readable medium is any data storage device that can store data which can be thereafter be read by a computer system. Examples of the computer readable medium include read-only memory, random-access memory, magnetic disks, magnetic tapes, CDs, DVDs and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to manage objects in an information lifecycle management system, comprising:
    retrieving objects from the information lifecycle management system;
    determining a score for each of the retrieved objects based on a score of at least one feature within respective ones of each of the retrieved objects, comprising:
        associating a valuation of the at least one feature with the score of the at least one feature, wherein the valuation of the at least one feature is based on a statistical importance of the feature;
        associating the score of the at least one feature with an importance of the at least one feature within a particular one of the retrieved objects and the importance of the feature within a population of objects to be managed in the information lifecycle management system;
        correlating the score for each of the retrieved objects to a value for each of the retrieved objects;
        determining a number of scores of the at least one feature to be included in the score for each of the retrieved objects;
        the determining of a number of scores of the at least one feature comprising at least one of the following steps:
            selecting a single feature having a maximum score for a selected retrieved object;
            selecting a particular number of top scoring features; and
            identifying a number of scores with Kullback-Liebler divergence;
            summing a predetermined number of top scores of features in each of the retrieved objects;
            determining a first set of statistics for each of the at least one feature based on information content associated with respective ones of each of the retrieved objects;
            determining a second set of statistics for each of the at least one feature based on information content associated with the population of objects to be managed in the information lifecycle management system;
            determining the score for each feature based on the first set of statistics and the second set of statistics; and
            determining the score for each of the retrieved objects based on the score for each feature in respective ones of each of the retrieved objects;
    managing each of the retrieved objects based on the score for each of the retrieved objects; and
    the managing each of the retrieved objects comprises:
        managing each of the retrieved objects in an information lifecycle engine;
        determining from the score for each of the retrieved objects a particular type of storage device that each of the retrieved objects is associated with;
        storing the retrieved object in tier one storage when a score for the retrieved object is above a specified value;

storing the retrieved object in a lower tier storage when the score for the retrieved object is below the specified value;

determining from the score for each of the retrieved objects how many copies of each of the retrieved objects to store and where to store each of the retrieved objects;

retrieving each of the objects from the information lifecycle management system at a priority based on the score for each of the retrieved objects;

retrieving each of the objects from the information lifecycle management system in an order based on the score for each of the retrieved objects;

preferentially managing higher scored retrieved objects;

determining if it is time to re-evaluate a retrieved object;

identifying retrieved objects to re-evaluate;

reassigning a score to a retrieved object to be re-evaluated;

managing a re-evaluated retrieved object based on a reassigned score, comprising:

moving a re-evaluated retrieved object from tier 2 storage to tier 1 storage when a reassigned score increases; and moving a re-evaluated retrieved object from tier 1 storage to tier 2 storage when a reassigned score decreases;

wherein the at least one feature within each of the retrieved objects occur in the metadata associated with each of the retrieved objects, and the retrieved object is one of a file, a document, a record, a table, or a database.

* * * * *